July 30, 1929.  J. J. PETERSON  1,722,678
SEAT
Filed April 16, 1928
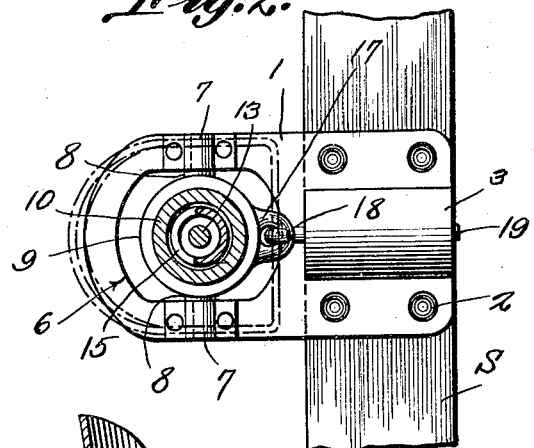
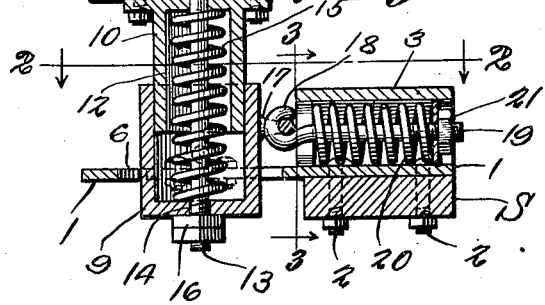
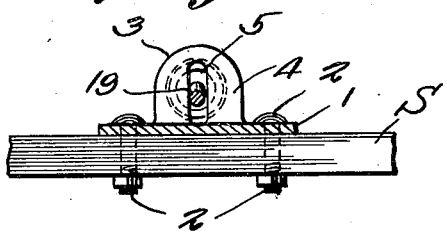
J. J. Peterson, Inventor
By CASnow Co.
Attorneys Patented July 30, 1929.

1,722,678

UNITED STATES PATENT OFFICE.

JOHN J. PETERSON, OF ANAHEIM, CALIFORNIA.

SEAT.

Application filed April 16, 1928. Serial No. 270,402.

This invention relates to a seat designed primarily for use on agricultural machines, trucks and the like, one of the objects being to provide a yieldingly supported seat so mounted as to swing about a transverse axis against the action of a resilient retarding means, thereby affording a seat which will protect the occupant from jolting and will provide a comfortable support.

A further object is to provide a seat which is simple and compact in construction and can be applied readily to a machine.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a central vertical section through the seat and a part of the structure on which it is mounted.

Figure 2 is a section on line 2—2, Figure 1.

Figure 3 is a section on line 3—3, Figure 1.

Referring to the figures by characters of reference 1 designates a base plate one end portion of which is adapted to be fastened by bolts 2 or the like upon a supporting structure S and on this end portion is provided a housing 3 one end of which has a head 4 provided with a slot 5 extending diametrically therein.

An opening 6 is formed in the plate 1 at a point where the plate projects away from the supporting structure S. At opposite sides of this opening are provided bearings 7 and in these bearings are journalled trunnions 8 extending in opposite directions from a tiltable socket member 9 which is preferably cylindrical. In this socket member is slidably mounted a standard 10 the upper end of which is bolted or otherwise fastened to the bottom of a seat 11. The standard 10 has a recess 12 extending thereinto from its lower end and extending through the standard and through the socket member 9 is a tie bolt 13 the lower portion of which is slidable through an opening 14 in the bottom of the socket member 9. A coiled spring 15 is mounted on the tie bolt and bears at one end against the bottom portions of the socket member 9 and at its upper end against the upper portion of the standard 10. Thus the spring constitutes a yielding support for the standard 10 and seat 11. The compression of the spring 15 can be regulated by means of nuts 16 engaging the lower threaded end of the tie bolt 13.

An eye 17 is extended from the socket member 9 at a point above the bearings 7 and this eye is engaged by a hook 18 at one end of a bolt 19. This bolt extends loosely through the slot 5 and through a coiled spring 20 seated in the housing 3. A nut 21 is mounted on the bolt and by means thereof the compression of the springs 20 can be varied.

Under normal conditions the spring 20, which thrusts against the slotted head 4 of the housing 3, serves to hold the socket member 9 and the standard 10 in upstanding positions as shown in Figure 1. When the seat 11 is subjected to a load, the spring 15 will yield downwardly, allowing the standard 10 to slide downwardly within the socket member 9. The occupant of the seat can tilt said seat rearwardly about the trunnions 8 but this tilting action will be retarded by the spring 20 because the eye 17 will pull through the bolt 19 upon the spring and can compress it against the head 4.

It will be noted that the seat with its yieldable means for supporting the same and for retarding the tilting action, is all in the form of a single structure complete in itself which can be applied readily to a support simply by fastening the plate 1 to the support. Not only will the spring 15 absorb shocks due to up and down movement of the structure on which the seat is mounted, but spring 20 will also serve as a cushioning means for absorbing shocks due to such forward movement of the supporting structure.

What is claimed is:

1. A seat for agricultural machines or the like including a socket member mounted for oscillation about a transverse axis, a standard mounted for sliding movement relative to the socket member, a seat carried by the standard, yielding means housed within the socket member and the standard for cushioning the seat, and yielding means connected to the socket member for retarding swinging movement of said member in one direction.

2. A seat for agricultural machines or the like including a socket member tiltably mounted, yielding means for controlling the tilting action of said member, a seat, a slidable and rotatable connection between the seat and the socket member, and resilient means for supporting the seat, said means being housed within the socket member and standard.

3. A seat for agricultural machines or the like including an attaching plate, a socket member tiltably mounted thereon, a standard slidably and rotatably mounted in the socket member, yielding means supported by the attaching plate for retarding the tilting action of the socket member, and cushioning means within the socket member and standard for yieldingly supporting the standard, and a seat mounted on the standard.

In testimony that I claim the foregoing as my own, I have hereto affixed by signature.

JOHN J. PETERSON.